US011883716B2

(12) United States Patent
Johansson et al.

(10) Patent No.: US 11,883,716 B2
(45) Date of Patent: Jan. 30, 2024

(54) THREE DIMENSIONAL OBJECT TRACKING USING COMBINATION OF RADAR DATA AND TWO DIMENSIONAL IMAGE DATA

(71) Applicant: Topgolf Sweden AB, Danderyd (SE)

(72) Inventors: Dennis Jan Johansson, Vallentuna (SE); Daniel Forsgren, Enebyberg (SE)

(73) Assignee: Topgolf Sweden AB, Danderyd (SE)

( * ) Notice: Subject to any disclaimer, the term of this patent is extended or adjusted under 35 U.S.C. 154(b) by 0 days.

(21) Appl. No.: 17/979,692

(22) Filed: Nov. 2, 2022

(65) Prior Publication Data

US 2023/0091774 A1 Mar. 23, 2023

Related U.S. Application Data

(63) Continuation of application No. 17/156,115, filed on Jan. 22, 2021, now Pat. No. 11,504,582, which is a
(Continued)

(51) Int. Cl.
*A63B 24/00* (2006.01)
*G01S 13/58* (2006.01)
(Continued)

(52) U.S. Cl.
CPC ........ *A63B 24/0021* (2013.01); *G01S 13/587* (2013.01); *G01S 13/72* (2013.01); *G01S 13/867* (2013.01); *A63B 2024/0034* (2013.01)

(58) Field of Classification Search
CPC .......... A63B 2220/89; A63B 2220/806; A63B 2220/807; G01S 13/58; G01S 13/72;
(Continued)

(56) References Cited

U.S. PATENT DOCUMENTS

| 4,673,183 A | 6/1987 | Trahan |
| 5,342,051 A | 8/1994 | Rankin et al. |

(Continued)

FOREIGN PATENT DOCUMENTS

| WO | WO 1997028856 | 8/1997 |
| WO | WO 2010086414 | 8/2010 |

OTHER PUBLICATIONS

"Extending Linear Regression: Weighted Least Squares, Heteroskedasticity, Local Polynomial Regression", 36-350, Data Mining, Oct. 23, 2009, 15 pages.
(Continued)

*Primary Examiner* — Michael A Cuff
(74) *Attorney, Agent, or Firm* — Fish & Richardson P.C.

(57) ABSTRACT

Methods and systems include, in at least one aspect: determining an optical model of an object in flight using two dimensional image data obtained from a camera, determining a radar model of the object in flight using radar data obtained from a radar device, combining the radar model with the optical model to produce three dimensional location information of the object in flight in three dimensional space, comparing the three dimensional location information of the object in flight with data representing an expected ball launch, and rejecting (or verifying) the object as an actual ball launch in response to the three dimensional location information of the object in flight differing (or not differing) from the data representing the expected ball launch by a threshold amount.

20 Claims, 8 Drawing Sheets

Related U.S. Application Data continuation of application No. 16/795,451, filed on Feb. 19, 2020, now Pat. No. 10,898,757.

(60) Provisional application No. 62/964,087, filed on Jan. 21, 2020.

(51) Int. Cl.
*G01S 13/86* (2006.01)
*G01S 13/72* (2006.01)

(58) Field of Classification Search
CPC .......... G01S 13/88; G06T 2207/10016; G06T 2207/10028; G06T 2207/30224
USPC ........................................................ 473/156
See application file for complete search history.

(56) References Cited

U.S. PATENT DOCUMENTS

| | | | |
|---|---|---|---|
| 5,413,345 A | 5/1995 | Nauck | |
| 5,489,099 A | 2/1996 | Rankin et al. | |
| 5,912,700 A | 6/1999 | Honey et al. | |
| 5,938,545 A | 8/1999 | Cooper et al. | |
| 5,953,056 A | 9/1999 | Tucker | |
| 6,233,007 B1 | 5/2001 | Carlbom et al. | |
| 6,236,940 B1 | 5/2001 | Rudow et al. | |
| 6,449,010 B1 | 9/2002 | Tucker | |
| 6,520,864 B1 | 2/2003 | Wilk | |
| 7,497,780 B2 | 3/2009 | Kiraly | |
| 7,843,510 B1 | 11/2010 | Ayer et al. | |
| 8,077,917 B2 | 12/2011 | Forsgren | |
| 9,418,705 B2 | 8/2016 | Kaps et al. | |
| 10,380,409 B2 | 8/2019 | Thornbrue et al. | |
| 10,866,065 B2 | 12/2020 | Baumgartner | |
| 2003/0103648 A1 | 6/2003 | Ito et al. | |
| 2004/0136592 A1 | 7/2004 | Chen et al. | |
| 2004/0258154 A1 | 12/2004 | Liu et al. | |
| 2005/0040710 A1 | 2/2005 | Ahn et al. | |
| 2006/0008116 A1 | 1/2006 | Kiraly | |
| 2007/0105637 A1 | 5/2007 | Shimizu | |
| 2007/0244667 A1 | 10/2007 | Ligotti | |
| 2007/0293331 A1 | 12/2007 | Tuxen | |
| 2007/0298897 A1 | 12/2007 | Kiraly | |
| 2008/0139330 A1 | 6/2008 | Tuxen | |
| 2008/0175441 A1 | 7/2008 | Nobuyuki et al. | |
| 2008/0199043 A1 | 8/2008 | Forsgren | |
| 2008/0287207 A1 | 11/2008 | Manwaring | |
| 2009/0067670 A1 | 3/2009 | Johnson et al. | |
| 2009/0225845 A1 | 9/2009 | Veremeev et al. | |
| 2009/0245571 A1 | 10/2009 | Chien et al. | |
| 2009/0295624 A1 | 12/2009 | Tuxen | |
| 2010/0041498 A1 | 2/2010 | Adams | |
| 2010/0210377 A1 | 8/2010 | Lock | |
| 2011/0159976 A2 | 6/2011 | Hohla et al. | |
| 2011/0286632 A1 | 11/2011 | Tuxen et al. | |
| 2012/0068879 A1 | 3/2012 | Tuxen | |
| 2013/0085018 A1 | 4/2013 | Jensen | |
| 2014/0191896 A1 | 7/2014 | Johnson et al. | |
| 2014/0228139 A1 | 8/2014 | Wilson et al. | |
| 2015/0262011 A1 | 9/2015 | Keat | |
| 2016/0048975 A9 | 2/2016 | Tuxen et al. | |
| 2016/0059072 A1 | 3/2016 | Volbrecht et al. | |
| 2016/0074704 A1 | 3/2016 | Volbrecht et al. | |
| 2016/0170015 A1 | 6/2016 | Tuxen | |
| 2016/0217325 A1 | 7/2016 | Bose et al. | |
| 2016/0243423 A1 | 8/2016 | Tuxen et al. | |
| 2016/0247292 A1 | 8/2016 | Tuxen et al. | |
| 2016/0306036 A1 | 10/2016 | Johnson | |
| 2016/0307335 A1 | 10/2016 | Perry | |
| 2016/0313441 A1 | 10/2016 | Tuxen | |
| 2016/0320476 A1 | 11/2016 | Johnson | |
| 2016/0339320 A1 | 11/2016 | Johnson | |
| 2017/0054950 A1 | 2/2017 | Yeo et al. | |
| 2017/0161561 A1 | 6/2017 | Marty | |
| 2017/0200277 A1 | 7/2017 | Keat | |
| 2017/0256066 A1 | 9/2017 | Richard et al. | |
| 2017/0322054 A1 | 11/2017 | Winter et al. | |
| 2017/0366866 A1 | 12/2017 | Davies et al. | |
| 2018/0011183 A1 | 1/2018 | Tuxen | |
| 2018/0120428 A1 | 5/2018 | Tuxen et al. | |
| 2018/0137662 A1 | 5/2018 | Simeone | |
| 2018/0322337 A1* | 11/2018 | Marty | G06T 7/20 |
| 2019/0111315 A2 | 4/2019 | Forsgren | |
| 2019/0147219 A1 | 5/2019 | Thornbrue et al. | |
| 2019/0192950 A1 | 6/2019 | Tuxen | |
| 2019/0391254 A1 | 12/2019 | Asghar | |
| 2020/0222757 A1 | 7/2020 | Yang | |

OTHER PUBLICATIONS

ErnestSports.com [online] "Ernest sports ES16 user manual", [retrieved on Jan. 25, 2017] retrieved from: http://www.ernestsports.com/ES16UserManualWeb.pdf, 28 pages.

ErnestSports.com [online] "Ernest sports golf launch monitors—ES16 tour," Jan. 2017 [retrieved on Jan. 25, 2017] retrieved from: http://www.ernestsports.com/es16-tour.html, 7 pages.

Hackaday.com [online] "Build a phased array radar in your garage that sees through walls," Apr. 7, 2015 [retrieved on Nov. 29, 2016] retrieved from: https://hackaday.com/2015/04/07/build-a-phased-array-radar-in-your-garage-that-sees-through-walls/, 22 pages.

Hackaday.com [online] "Try radar for your next project," Feb. 24, 2014 [retrieved on Nov. 29, 2016] retrieved from: https://hackaday.com/2014/02/24/guest-post-try-radar-for-your-next-project/, 23 pages.

International Application No. PCT/EP2021/051254, Notification of Transmittal of the International Search Report and the Written Opinion of the International Searching Authority, dated May 3, 2021, 14 pages.

Jonas Sköld, "Estimating 3D-trajectories from Monocular Video Sequences", Degree Project, in Computer Science and Communication, Second Level, KTH Royal Institute of Technology, School of Computer Science and Communication, Stockholm, Sweden, Jun. 24, 2015.

Open CV, "Basic concepts of the homography explained with code", https://docs.opencv.org/master/d9/dab/tutorial_homography.html, downloaded Sep. 27, 2019, 11 pages.

P.W. Bearman and J.K. Harvey, Golf ball aerodynamics, Aeronautical Quarterly, pp. 112-122, May 1976.

Wikipedia, "Random sample consensus", https://en.wikipedia.org/wiki/Random_sample_consensus, downloaded May 27, 2019, 9 pages.

* cited by examiner

THREE DIMENSIONAL OBJECT TRACKING USING COMBINATION OF RADAR DATA AND TWO DIMENSIONAL IMAGE DATA

CROSS-REFERENCE TO RELATED APPLICATIONS

This application is a continuation application of and claims priority to U.S. application Ser. No. 17/156,115, filed on Jan. 22, 2021, which is a continuation application of and claims priority to U.S. application Ser. No. 16/795,451, filed on Feb. 19, 2020, which claims benefit under 35 U.S.C. § 119(e)(1) of U.S. Provisional Application No. 62/964,087, filed on Jan. 21, 2020, which are incorporated by reference herein.

BACKGROUND

This specification relates to tracking an object in flight, such as a golf ball, using data obtained from different image sensor technologies.

Systems and methods for tracking the flight of a golf shot with sensors include launch monitors, full flight two dimensional (2D) tracking, and full flight three dimensional (3D) tracking. Commonly used sensor types are cameras, Doppler radar, and phased array radar. The launch monitor method is based on measuring a set of parameters that can be observed during the swing of the golf club and the first few inches of ball flight after the club has impacted the ball. The measured parameters are then used to extrapolate an expected ball flight using mathematics and physics modelling.

In contrast, full flight 3D tracking systems are characterized by a design that attempts to track the full flight of the golf shot, rather than extrapolating from launch parameters. In addition, full flight 2D tracking systems track the shape of a golf shot, as seen from a particular angle, but will not produce 3D information and generally cannot be used to determine key parameters, such as the distance the ball travelled. Finally, full flight 3D tracking using a combination of camera and Doppler radar data has been described in U.S. Patent Pub. No. 2019-0111315-A2.

SUMMARY

This specification describes technologies relating to tracking an object in flight, such as a golf ball, using data obtained from camera and radar sensor technologies, and more particularly to a full flight 3D tracking system that uses a combination of camera and radar data along with a two part model for the radar data.

In general, one or more aspects of the subject matter described in this specification can be embodied in one or more methods that include: obtaining two dimensional image data of a golf ball in flight, the two dimensional image data originating from a camera; modeling a two dimensional trace of the golf ball in flight using the two dimensional image data; obtaining radar speed data of the golf ball in flight, the radar speed data originating from a radar device associated with the camera; modeling a speed of the golf ball in flight using the radar speed data, wherein modeling the speed of the golf ball includes fitting a polynomial function to a first portion of the radar speed data and fitting an exponential function to a second portion of the radar speed data; combining the modelled speed of the golf ball in flight with the modelled two dimensional trace of the golf ball in flight to form a three dimensional trace of the golf ball in flight; and outputting for display the three dimensional trace of the golf ball in flight in three dimensional space. Other embodiments of this aspect include corresponding systems, apparatus, and computer program products.

A system can include: a camera; a radar device; and a computer including a hardware processor and a memory coupled with the hardware processor, the memory encoding instructions configured to cause the hardware processor to perform operations in accordance with any of the methods herein. The radar device can be a single antenna Doppler radar device designed to provide speed data but not distance data. The camera and the radar device can be aligned with each other and integrated into a shared sensor housing. The system can include a broadcast camera. Further, a non-transitory computer-readable medium can encode instructions that cause a data processing apparatus associated with a camera and a radar device to perform operations in accordance with any of the methods herein.

The radar device can be designed to provide the radar speed data but not distance data of the golf ball in flight, and the combining can include: finding radial distances to the golf ball by integration of speed values obtained from the modelled speed of the golf ball; and calculating three dimensional locations of the golf ball in space, the calculating including using the radial distances to find depth distances to the golf ball, and using the depth distances and horizontal and vertical values obtained from the modelled two dimensional trace to find horizontal and vertical distances to the golf ball based on at least a focal length of the camera.

The polynomial function can be a quadratic function, and modeling the speed of the golf ball in flight using the radar speed data can include using one or more weighted models for a preamble portion of the radar speed data. Fitting the polynomial function to the first portion of the radar speed data can include using random sampling to exclude outliers in the radar speed data.

Modeling the speed of the golf ball in flight using the radar speed data can include: fitting the exponential function to initial values of the radar speed data to form an exponential model of the radar speed data; using the exponential model of the radar speed data to identify the first portion of the radar speed data, which does not match the exponential model; performing the fitting of the polynomial function to the first portion of the radar speed data and one or more values of the second portion of the radar speed data to form a polynomial model that fits the first portion of the radar speed data and meets the exponential model of the radar speed data at a transition point between the first portion and the second portion of the radar speed data; and updating the exponential model by performing the fitting of the exponential function to the second portion of the radar speed data as additional values in the radar speed data are received from the radar device.

Performing the fitting of the polynomial function to the first portion of the radar speed data and the one or more values of the second portion of the radar speed data can include iteratively including more of the one or more values of the second portion of the radar speed data until a threshold level of continuity between the polynomial model and the exponential model is reached at the transition point. Fitting the exponential function to the initial values of the radar speed data can include using random sampling to exclude outliers in the radar speed data, and updating the exponential model can include using the exponential model to exclude one or more of the additional values from being included in the second portion of the radar speed data.

Modeling the two dimensional trace of the golf ball in flight using the two dimensional image data can include: finding an initial version of the two dimensional trace of the golf ball in flight; receiving an initial version of the three dimensional trace of the golf ball in flight from the combining; extending the initial version of the three dimensional trace in three dimensional space in accordance with physical-world conditions associated with the golf ball in flight to find at least one three dimensional location beyond the initial version of the three dimensional trace; projecting the at least one three dimensional location into a two dimensional image plane of the camera to locate a two dimensional region; and processing the two dimensional region in the two dimensional image data to extend the two dimensional trace of the golf ball in flight.

Extending the initial version of the three dimensional trace in three dimensional space can include: modifying the physical-world conditions associated with the golf ball in flight to form two or more sets of physical-world conditions; modeling the golf ball's flight in three dimensional space in accordance with the two or more sets of physical-world conditions to generate two or more ball flights in three dimensional space; projecting each of the two or more ball flights in three dimensional space into the two dimensional image plane of the camera to form two or more two dimensional paths for the golf ball in flight; comparing the two or more two dimensional paths with at least a portion of the two dimensional image data corresponding to the initial version of the two dimensional trace; and selecting, based on the comparing, one of the two or more sets of physical-world conditions for extension of the initial version of the three dimensional trace in three dimensional space. Further, modeling the two dimensional trace of the golf ball in flight using the two dimensional image data can include determining a size of the two dimensional region based on an estimate of error for the initial version of the three dimensional trace in three dimensional space.

Finally, the method and operations of a system and/or encoded instructions can include: obtaining a set of two dimensional image data from the camera; modeling a two dimensional trace of an object in flight using the set of two dimensional image data; obtaining a set of radar speed data from the radar device associated with the camera; modeling a speed of the object in flight using the set of radar speed data; combining a radar model of the speed of the object in flight with an optical model of the two dimensional trace of the object in flight to form a three dimensional trace of the object in flight; comparing an initial portion of the three dimensional trace of the object in flight with data representing a typical golf ball launch in three dimensions; and identifying the three dimensional trace of the object in flight as not a golf ball when the initial portion of the three dimensional trace of the object in flight differs from the data representing the typical golf ball launch in three dimensions by a threshold amount.

Various embodiments of the subject matter described in this specification can be implemented to realize one or more of the following advantages. A more accurate model of the radar speed data, from the perspective of the radar device, enables improved radar data modelling and thus an improved hybrid tracking of an object in flight using both radar data and 2D image data. The accuracy of ball launch detection and the accuracy of in-flight ball tracking can be improved. Moreover, a more accurate model of the radar speed data provides a better understanding of the ball flight overall, which can improve the acquired and presented data for each ball flight, e.g., launch ball speed and launch angle.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
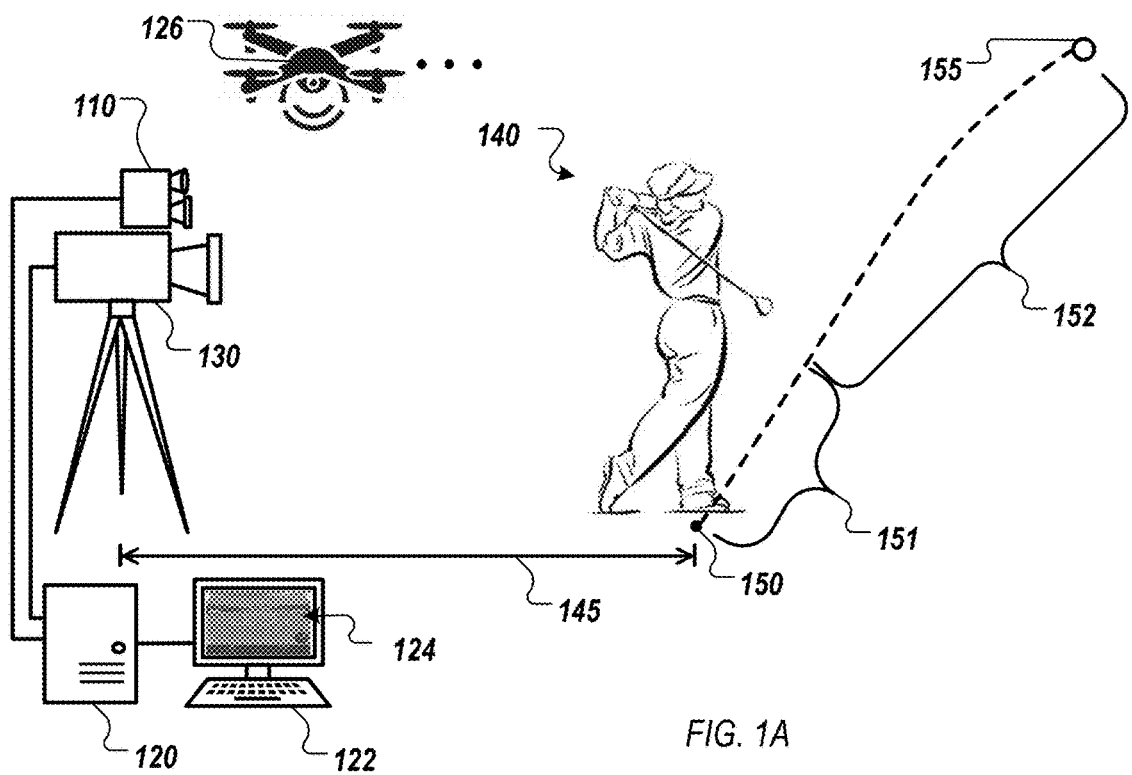
FIG. 1A shows an example of a system that performs 3D tracking of a golf ball in flight.

FIG. 1A shows an example of a system that performs 3D tracking of a golf ball in flight. The system includes at least one sensor unit 110 communicatively coupled with one or more server computers 120, one or more personal computers 122, or a combination of these. The sensor unit(s) 110 includes both an object tracking camera and a radar device, e.g., a Doppler radar device. The camera and radar device can be aligned with each other and integrated into a shared sensor housing, as shown (note that the alignment need not be precise or in any way calibrated, in some implementations, since the radar device need not be used to determine any directional information, as described in further detail below). In addition, although represented using physical wires/cables in FIG. 1A, it will be appreciated that the communicative coupling between the sensor unit(s) 110 and the one or more computers 120, 122 can be implemented using wireless technologies, such as near field communications (NFC), Bluetooth, WiFi, and/or one or more mobile phone technologies. Further, one or more of the one or more computers 120, 122 can be integrated into the sensor unit 110 in some implementations.

In the example of FIG. 1A, the camera and the radar device are integrated together into a common sensor unit 110 that is associated with an additional camera 130, and both the sensor unit 110 and the additional camera 130 are oriented toward a golfer 140 who has hit a golf ball 155 from a starting position 150 into a flight path in the direction of a hole or other target. The additional camera 130 can be a television (TV) camera adapted to produce a signal for live transmission, or for recording. In some implementations, the sensor unit 110 is co-located with and mechanically affixed to the additional camera 130. In other implementations, the sensor unit 110 is in the same general area as the additional camera 130, but not specifically attached to it. Other variations are also possible, such as detailed further below.

In these various implementations, different types of modelling are used for different portions of the ball flight observations, such as an initial portion 151 and a later portion 152 of the ball flight. A hybrid of radar and optical tracking combines camera based full flight 2D tracking with data from a radar to produce full flight 3D tracking. Golf ball tracking for TV productions typically requires a low latency, to allow the producer to swap to a catching camera once the ball lands, while still getting a trace from the ball's starting position 150. Thus, quickly and accurately detecting a ball launch is important in the context of TV golf ball tracking, but it is also important in other contexts, such as 3D tracking of golf balls hit at a golf range.

In some implementations, the distance 145 between the sensor unit 110 and the initial position 150 of the golf ball 155 is provided information (e.g., a predetermined starting point from which the golf ball 155 is known to be hit, or a distance parameter entered as input to one or more computers 120, 122). In some implementations, the distance 145 is determined automatically (e.g., by identifying the golfer 140 in image data using computerized object classification, calculating a distance to the identified golfer 140 using trigonometry and a known or presumed height of the golfer 140, and treating the distance to the golfer 140 as equal to the distance 145 to the initial position 150 of the golf ball 155). Note that the distance 145 can also be used to give a ball size criterion to assist in identifying the golf ball 150 in the image data generated by the sensor unit 110. Further, in some implementations, the starting position 150 of the golf ball is not observed by the camera in the sensor unit 110, and the starting position 150 must be determined by backward extrapolation of the 3D path of the ball's flight.

Moreover, the system can be designed to translate ball positions registered by the sensor unit 110 to corresponding positions in video data obtained by the additional camera 130, and using this translation, a graphical representation of the ball's flight path can be overlaid onto the video data for transmission and/or recording. This translation between the view of the camera of the sensor unit 110 and the additional camera 130 can be performed using homography techniques, such as are described in R. Hartley & A. Zisserman, Multiple View Geometry in Computer Vision, 2$^{nd}$ Edition, Cambridge University Press, March 2004. Furthermore, in some implementations, the present systems and techniques are combined with the 2D ball flight tracking systems and techniques described in U.S. Pat. No. 8,077,917, issued on Dec. 13, 2011, and titled "SYSTEMS AND METHODS FOR ENHANCING IMAGES IN A VIDEO RECORDING OF A SPORTS EVENT", which patent is hereby incorporated by reference.

In some implementations, no additional camera 130 is included, and 3D ball positions determined using the sensor unit 110 can be used to augment other data or media. For example, the determined 3D ball positions can be used to generate a 3D representation of the ball's flight path within a 3D computer model 124 of an environment for the golf ball 155. This environment can be a representation of the actual, physical environment that the golfer 140 stands in (e.g., a particular hole on a particular golf course) or the environment can be a virtual environment that exists only in the computer model 124. For example, a flying drone 126 can be used to build a 3D model of a physical golf course, where this 3D model is then used as the virtual environment in which to display the 3D ball tracking data.

In any case, the object tracking camera and the radar device within the sensor unit 110 provide data which are combined using one or more computers 120, 122 to provide 3D flight tracking of the golf ball 155. The data from this hybrid sensor 110 is aligned with a predefined coordinate system (e.g., of a virtual golf course) so the output data can be combined with other data (e.g., from the camera 130) before viewing. In general, the position and direction of the sensor unit 110 needs to be determined. In addition, when the object tracking camera and the radar device are not co-located in a common housing 110, some reference frame alignment between the two sensors is also needed, as detailed further below.

Figure 1B:
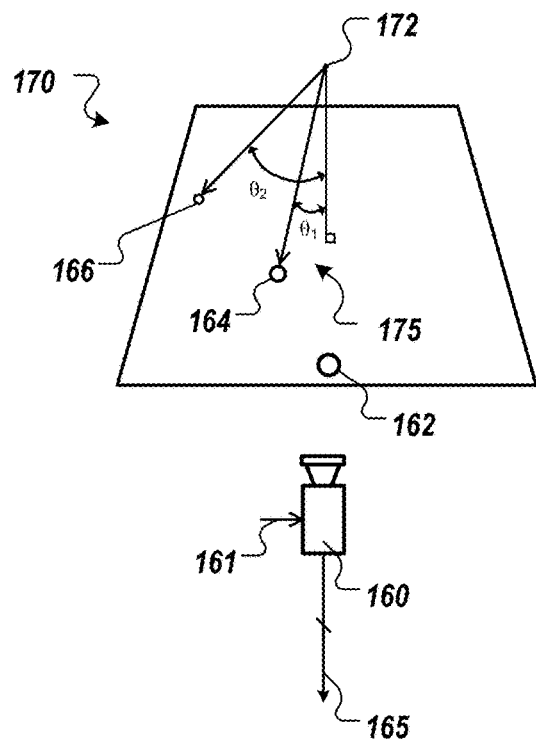
FIGS. 1B and 1C are diagrams representing 3D tracking of a golf ball in flight using both a camera and a Doppler radar device.
Figure 1C:
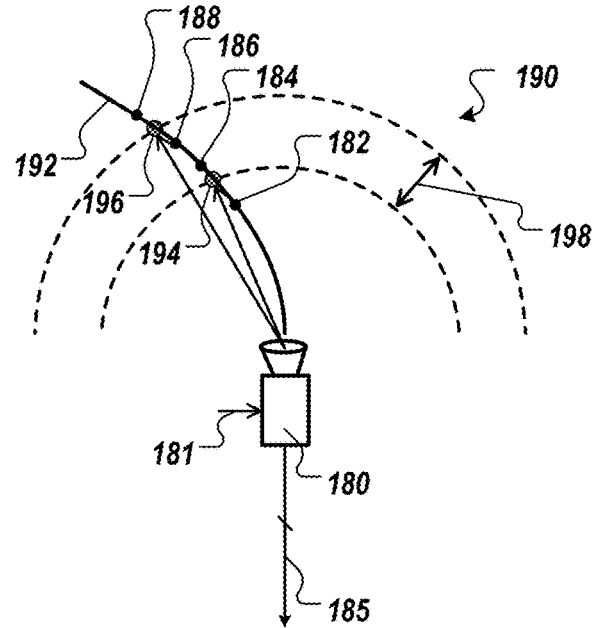

FIG. 1B is a diagram representing an object tracking camera 160 (e.g., a single CMOS (Complementary Metal Oxide Semiconductor) based digital video camera) that produces 2D image data 165 (e.g., for 2D flight tracking of the golf ball 155). FIG. 1C is a diagram representing a Doppler radar device 180 (e.g., a single antenna Continuous Wave (CW) or chirped Doppler radar device) that produces radar data 185 of the golf ball 155 in flight, where the radar data 185 is used to supplement the 2D image data 165 to provide a complete 3D tracking system, which can do full flight 3D tracking of golf balls.

In some implementations, the camera 160 and the radar device 180 are attached to each other so that they both aim in roughly the same direction (e.g., the camera 160 and the radar device 180 can be aligned with each other and integrated into a common housing). In other implementations, the camera 160 and the radar device 180 are not attached to each other, and a specific orientation of the radar device 180 need not be required. For example, the location and aim of the camera 160 can be known (or determined from observation by the camera 160), and provided the relative location of the radar device 180 with respect to the camera 160 is known, then the data streams 165, 185 can be readily combined. Nonetheless, it should be noted that both the camera 160 and the radar device 180 are both aimed generally down the line of the expected golf shot so that each of the camera 160 and the radar device 180 contribute to full flight observation of the ball, in contrast with a launch monitor approach, where a camera is aimed toward the ball and perpendicular to the expected line of the golf shot (i.e., the camera only sees a small initial portion of the ball's flight).

Further, while co-location and alignment is not required, it should be noted that co-locating and aligning the radar device 180 and the camera 160, such that they have essentially the same location and orientation as each other, allows the system complexity to be reduced substantially since the camera 160 and the radar device 180 can be treated as a single sensor device in a single location that provides two different data streams 165, 185. In addition, the radar device 180 can be built so as to communicate its readings to the camera 160 (radar data 185 goes to camera 160, e.g., over a short serial cable), and the embedded circuitry in the camera 160 can be updated (e.g., by writing new firmware for the camera 160) to make those radar readings available over the same API (Application Programming Interface) and the same physical cable as the camera 160. This removes the need to have a second data path from the camera+radar unit 110, which can be a fairly big benefit in golf production where the sensor 110 may be deployed a mile or more from the TV production facilities (where the analyzing computer may be positioned).

The 2D image data 165 from the camera 160 is used to identify observations 162, 164, 166 of the golf ball in the 2D frame 170 of the camera 160. These observations include an initial observation 162 of the ball before it is hit, as well as in-flight observations 164, 166 of the ball after it has been hit. Note that only two in-flight observations are shown for ease of description, but in practice, there will be many in-flight observations of the ball as the optical sub-system tracks the 2D flight of the golf ball as seen by the camera 160 within the 2D frame 170. Subject to the frame rate (e.g., 30 frames per second, 60 frames per second, 120 frames per second, etc.) of the camera 160, the golf ball will typically be observed hundreds of times in the video stream 165 during the course of the 2D tracking for a single golf shot. In addition, in some implementations, the camera 160 includes one or more inputs 161 to receive settings and/or programming to configure the camera 160 for operations in a given system. For example, in some implementations, the camera has a predetermined frame rate, which is programmable through an input 161.

For the in-flight observations 164, 166, the 2D image data 165 is processed to determine angles 175 for the in-flight observations 164, 166. In this example, each of the angles 175 ($\theta_1$ and $\theta_2$) is the angle between the camera sensor center and the location of the ball observation on the camera sensor. Viewing the camera 160 using a pinhole model, the sensor area 170 is one part of the camera 160, but the camera also includes the virtual "pinhole" 172 (created by the lens of the camera 160) located one focal length in front of the sensor. All rays pass through the pinhole 172 before they hit the sensor, and the angles 175 are the angles (in 3D) between a particular ray of light and the reference perpendicular ray of light that passes through the pinhole 172 and hits the center of the sensor. Thus, the angle 175 is the angle between the "observation ray" associated with the in-flight observations 164, 166 and the center of the sensor area 170, in relation to the virtual pinhole 172 created by the camera lens (the focal length of the camera 160 is the distance from the sensor plane 170 to the pinhole 172).

Other angles can be used. The important point is that the 2D image tracking sub-system is used to determine angles to the ball observations, rather than using radar data to determine such angles. This allows the radar device 180 to be a much simpler device, including potentially a radar device that provides only speed information (note that a speed only radar device is typically less complex and less expensive than a radar device that provides distance information). In some implementations, the radar device 180 is a phased array radar device, but even in such cases, the phased array radar device 180 is not relied upon to accurately measure angles to the ball, which allows the radar device 180 to be miniaturized, and the antenna array (when used) need not have a certain width and height to be able to accurately measure angles. Since the angular resolution of the system is provided by the camera 160, fine detail regarding the shape of the ball flight can be readily detected without the use of a larger and/or more complicated radar device 180.

In some implementations, the radar device 180 is a single antenna radar device that only provides speed data 185 (e.g., a beat sensor that has no idea of angle or distance to the object). In some implementations, the radar device 180 is a CW Doppler radar device. In some implementations, the radar device 180 provides distance data 185. In various implementations, the radar device 180 can be an impulse radar device, a Frequency Modulated Continuous Wave (FMCW) radar device, a phased array radar device, etc. In some implementations, the radar device 180 provides angular data 185 regarding the object.

In some implementations, the data 185 is collected from the radar device 180 by polling the radar device 180 multiple times per second. In addition, the radar device 180 can include one or more inputs 181 to receive settings and/or programming to configure the radar device 180 for operations in a given system. For example, a setting can be entered in the radar device 180 through an input 181 such that the device 180 will report one speed reading per measurement. As another example, when the radar device 180 includes the capability of determining angles to the ball, the radar device 180 can be programmed through an input 181 so as to control the use of the angular information to aim the radar beams in the direction of an object being tracked. Note that even in such cases, the angles to the ball used for determining 3D positions will still be determined using the image data 165 since this data will provide better angular resolution.

The radar device 180 detects the flight of the ball by providing measurements 182, 184, 186, 188 of the ball as it flies through the space 190 in front of the radar device 180. As noted above, these measurements 182, 184, 186, 188 can include speed measurements or distance measurements. In either case, due to differences between the frame rate of the camera 160 and the measurement timing of the radar device 180, or because of gaps in the data 185 provided by the radar device 180, there will typically not be radar data available at exactly the same times as the camera observations 164, 166. To address this issue, interpolation techniques can be used on the measurements 182, 184, 186, 188 to find intermediate data points 194, 196 that match up with the camera observations 164, 166.

As will be appreciated, since the data points 194, 196 match up with the camera observations 164, 166, the time 198 between these data points 194, 196 is equal to the inverse of the predetermined frame rate of the camera 160, which facilitates the combining process for the two data streams 165, 185. In some implementations, curve fitting techniques are used to extrapolate the radar data 185 to a continuous function 192 of time for the object (e.g., the golf ball). By fitting a curve to the data, and potentially updating that curve fitting as additional data comes in, a radar measurement at any point in time can readily be obtained by plugging the time value into the continuous function 192. Further, in some implementations, in addition to building a model of the ball's speed from the radar data 185, a model of the ball's 2D path is built from the 2D image data 165.

Figure 2A:
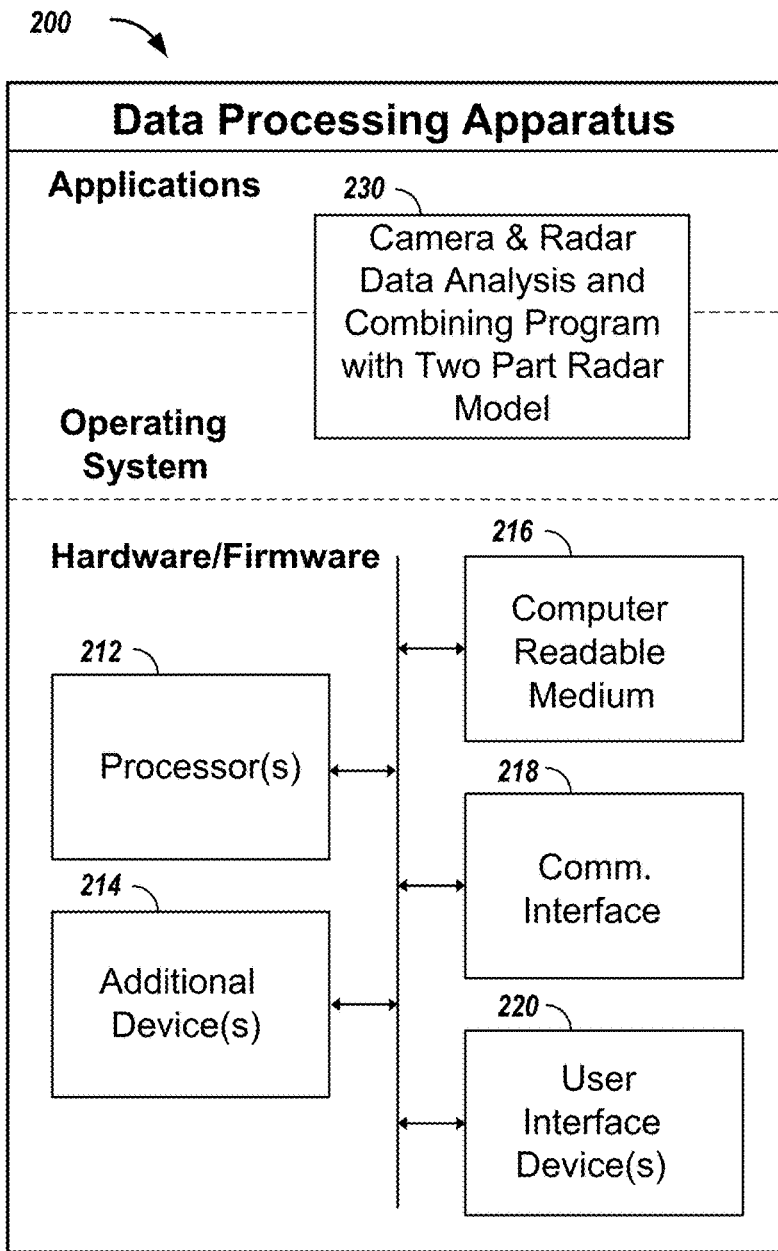
FIG. 2A is a schematic diagram of a data processing system.
Figure 2A:
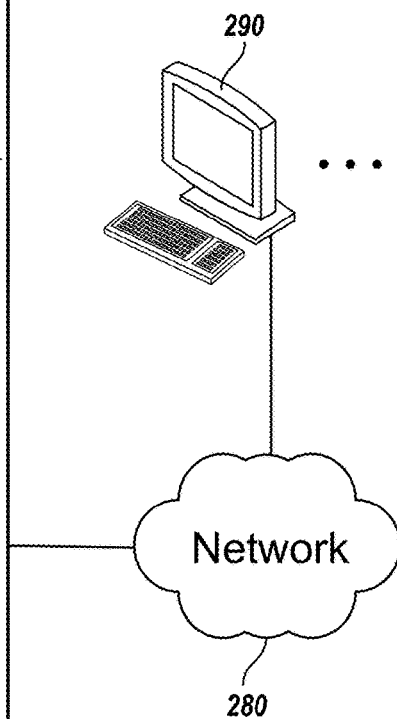

FIG. 2A is a schematic diagram of a data processing system including a data processing apparatus 200, which can be programmed as a client or as a server. The data processing apparatus 200 is connected with one or more computers 290 through a network 280. While only one computer is shown in FIG. 2A as the data processing apparatus 200, multiple computers can be used. Thus, one or more of the computers 120, 122 from FIG. 1A can be implemented using data processing apparatus 200.

The data processing apparatus 200 includes various software modules, which can be distributed between an applications layer and an operating system. These can include executable and/or interpretable software programs or libraries, including a program 230 that operates as a 3D object flight tracking system in which camera and radar data are analyzed and combined, and the radar data is modeled using a two part radar model, as described herein. The number of software modules used can vary from one implementation to another. Moreover, the software modules can be distributed on one or more data processing apparatus connected by one or more computer networks or other suitable communication networks.

The data processing apparatus 200 also includes hardware or firmware devices including one or more hardware processors 212, one or more additional devices 214, a computer readable medium 216, a communication interface 218, and one or more user interface devices 220. Each processor 212 is capable of processing instructions for execution within the data processing apparatus 200. In some implementations, the processor 212 is a single or multi-threaded processor. Each processor 212 is capable of processing instructions stored on the computer readable medium 216 or on a storage device such as one of the additional devices 214. The data processing apparatus 200 uses its communication interface 218 to communicate with one or more computers 290, for example, over a network 280. Thus, in various implementations, the processes described can be run in parallel or serially, on a single or multi-core computing machine, and/or on a computer cluster/cloud, etc.

Examples of user interface devices 220 include a display, a touchscreen display, a camera, a radar device, a speaker, a microphone, a tactile feedback device, a keyboard, and a mouse. The data processing apparatus 200 can store instructions that implement operations associated with the modules described herein, for example, on the computer readable medium 216 or one or more additional devices 214, for example, one or more of a floppy disk device, a hard disk device, an optical disk device, a tape device, and a solid state memory device.

To obtain the radar and camera data, the data processing apparatus 200 includes one or more communication interfaces 218, such as interfaces for the wired or wireless technologies described above in connection with FIG. 1A. In some implementations, the data processing apparatus 200 also includes the camera 160 and the radar device 180 (e.g., integrated into a single housing 110), in which case, the camera 160 and the radar device 180 also form part of the structures used to obtain the radar and camera data. For example, in some implementations, a single apparatus 200 includes a single camera 160, a single antenna Doppler radar device 180, and a computer programmed to retrieve, analyze, interpolate (as needed), and blend the camera and radar data to form three dimensional location information of an object (e.g., a golf ball) in three dimensional space as it flies in front of the 3D flight tracking apparatus 200.

When the radar data provides only ball speed, the ball speed reported by the radar device will (because of the nature of the Doppler effect) not represent the actual speed of the ball through the air. Rather the radar data will correspond to the radial speed at which the ball distances itself from the radar device. Envision a circle at some distance R from the radar device, and as the ball travels along the perimeter of that circle, the radar device will report a radial speed of zero because the ball does not distance itself from the radar device. However, if the ball travels on any other path, the distance from the radar device will change, the speed at which this distance changes will be detected by the radar Doppler shift, and this radial speed will be reported by the radar device.

Figure 2B:
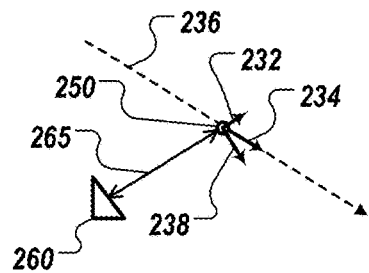
FIG. 2B is a diagram representing an example of radar data processing.

FIG. 2B is a diagram representing an example of radar data processing. The radar antenna 260 is a distance 265 away from a golf ball 250 at a certain time. The speed measurement obtained using the radar antenna 260 is the radial speed 232, but this is only the radial component of the speed 234 of the ball 250 along the ball trajectory 236. The speed measurement obtained using the radar antenna 260 does not include the tangential speed component 238. Since the time between each camera observation of the ball is known (it is determined by the camera frame rate, as discussed above), the radial speed 232 for each observation can be used to determine how the distance between the ball 250 and the radar device (and thus the camera, e.g., when co-located with the radar device) increases for each new observation of the ball, in accordance with the following equation:

$$R_n = R_{n-1} + S_n * dt, \quad (1)$$

where $R_n$ is distance from radar at observation n, and $S_n$ is the radial speed at observation n, and dt is the time between any pair of consecutive observations. $R_0$ is the distance between the ball and the radar before the ball is struck. $R_0$ is preferably determined before the ball is struck as it will typically be an input to the distance calculation for the first observation of the ball. There are several possible ways to determine or estimate this distance. For example, the distance between the camera and the golf ball can be manually measured and entered into the system before it is used, or the distance can be determined by an observed size of the ball and/or the golfer in the camera data. Also, the equation (1) example above shows a linear interpolation for ease of explanation, but as will be appreciated, exponential and polynomial interpolation of the data can be used.

Once the distance R between the radar/camera and the ball 250 is known at a given observation, e.g., using equation (1) and iterative processing in program 230, the 3D location of the ball 250 can be determined using the found radial distance 265 and details of the camera observation, such as by using the following linear algebra in the program 230:

$$Z_n = R_n * \cos(\theta_n), \quad (2)$$

$$X_n = Z_n * dx_n / f, \text{ and} \quad (3)$$

$$Y_n = Z_n * dy_n / f, \quad (4)$$

where n is the observation number, f is the focal length of the camera optics (e.g., measured in pixels), $\theta$ is the angle between camera sensor center and the location of the ball observation on camera sensor, dx is the horizontal offset (e.g., in pixels) between ball location on the sensor and the sensor center, and dy is the vertical offset (e.g., in pixels) between the ball location on sensor and the sensor center. Note that $(X_n, Y_n, Z_n)$ describes the 3D location of the ball at observation number n, and thus the entire flight of the golf ball 250 can be described in 3D coordinates. In this example, the coordinate system will have its origin at the co-located radar and camera, the Z axis will point in the direction of the camera, the X axis will be horizontal left-to-right, and the Y axis will point downwards, perpendicular to the Z axis. Other arrangements are also possible, depending on the orientation of the image and camera in the final coordinate system. For example, the origin of the image can be in the top-left corner, in which case, Y points downwards and X rightwards. Merely flipping Y will however also flip the handedness of the system, which can introduce complications for a given implementation, e.g., OpenGL has Z flipped instead of Y (i.e., the camera is looking down the negative Z axis, and Y is pointing up, and X to the right), and while math literature often uses right-handed systems, some code, e.g., DirectX, optionally uses a left-handed system.

As will be appreciated, the coordinate system is derived from the pinhole camera model discussed above. In addition, in some implementations, a specific direction is chosen for the coordinate system that is different from the angle at which the camera is pointing. For instance, if the trajectory data is to be used by another system, such as a TV broadcast system or a virtual game environment system, it is important to have established a common understanding of the direction of the coordinate system and how it relates to the real world. This can be accomplished using known coordinate transformation techniques. For example, a target object in the camera view can be agreed upon, and the direction of that target can then be used to define the "north" of the coordinate system. Rotating the coordinate system to match the selected target can involve determining the angle of the target relative to the center of the camera in both the horizontal and vertical planes, and then rotating the output data to compensate for those angles. The target angles can be readily derived from the pinhole camera model, provided the focal length of the camera system and the pixel size are known. For additional details regarding coordinate system transformations, see R. Hartley & A. Zisserman, Multiple View Geometry in Computer Vision, 2nd Edition, Cambridge University Press, March 2004.

Although the above example focuses on a co-located camera and radar, where the radar device only measures speed, other implementations are also possible. The radar device 180 can be separate from the camera 160 used for 2D tracking. When the radar device 180 and the camera 160 are not in the same spot, similar but slightly more complicated calculations are used to blend the radar and camera data, but using the same basic principles described herein. Note that both the camera 160 and the radar device 180 should be positioned so that they have a fair chance to capture a major portion of the ball flight. In practice, both sensors 160, 180 should be positioned in the vicinity of the golfer and be aimed "down the line" of the golf shot.

When the radar device 180 and the camera 160 are not in the same location, their data can be combined as follows. The radar data is used to keep track of the distance R between the radar device 180 and the ball at each point in time. This information can be seen as a sphere in 3D with radius R, and the radar indicates that the ball is located somewhere on the surface of that sphere. Meanwhile, the camera 160 tracks the same ball and knows the angles (beta and gamma) for a straight line between the camera 160 and the ball for each point in time. If the locations in 3D space of both radar device 180 and the camera 160 are known, and the angle the camera 160 is directed is known, the 3D position of the ball can be found by using appropriate mathematical calculations to find the intersection between the sphere around the radar device 180 and the straight line between the camera 160 and the ball. In some cases, the line will intersect with the sphere twice, and heuristics can be used to determine which of the two intersections represent the true ball position.

Figure 3A:
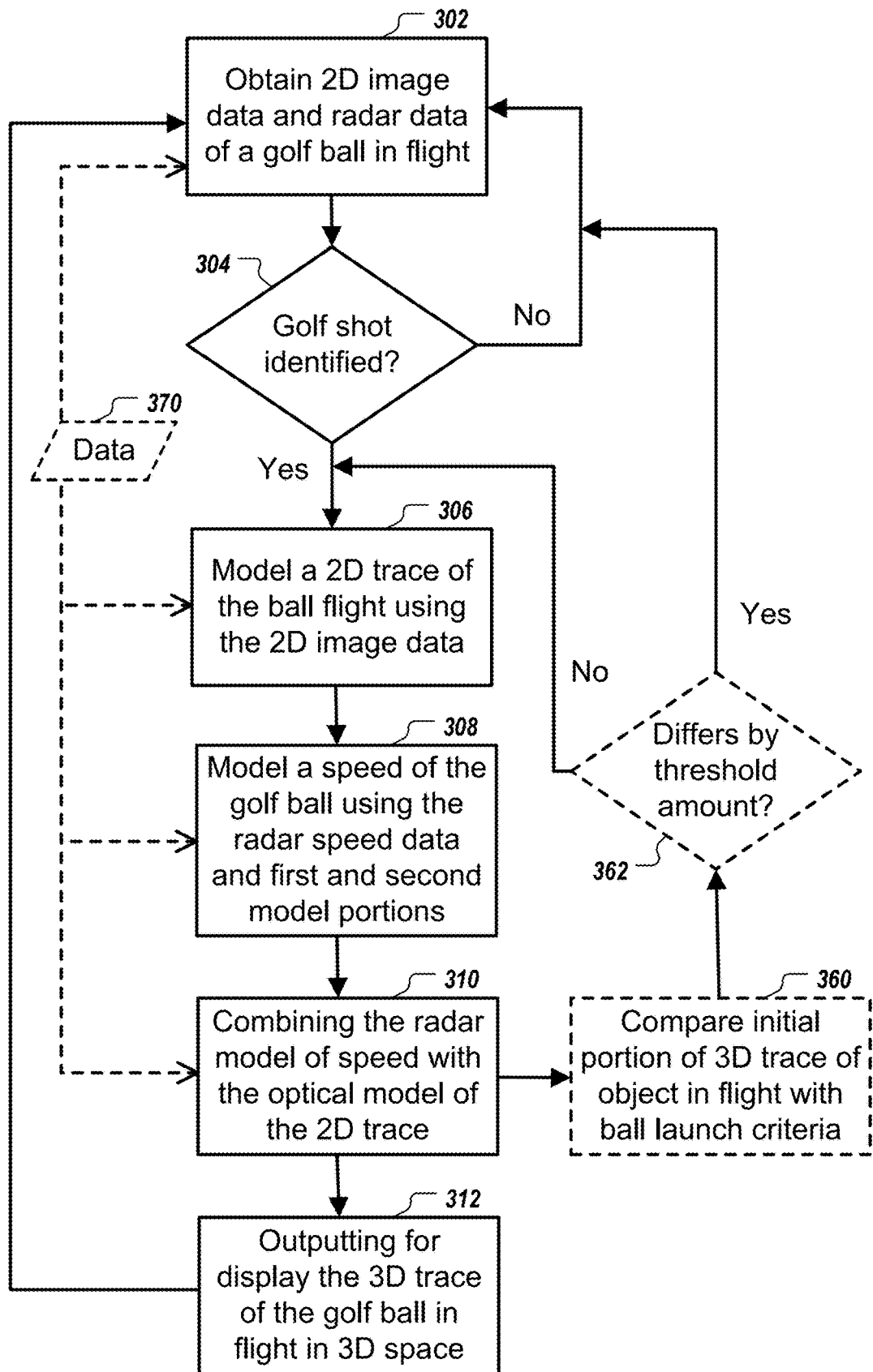
FIG. 3A is a flowchart showing an example of a process to perform 3D tracking of a golf ball in flight, as can be implemented in the systems of FIGS. 1A-2B.

FIG. 3A is a flowchart showing an example of a process to perform 3D tracking of a golf ball in flight, as can be implemented in the systems of FIGS. 1A-2B. Two dimensional image data (e.g., from camera 160) and radar speed data (e.g., from radar device 180) is obtained 302 (e.g., by data processing apparatus 200) of a golf ball in flight. In some implementations, the radar speed data is received directly from the radar device (e.g., when the radar device is a single antenna Doppler radar device that outputs speed data). In some implementations, the radar device provides distance data in addition to speed data, and the speed data can be extracted from the radar device output.

The obtained data is analyzed (e.g., by data processing apparatus 200) to identify 304 a golf shot. In some implementations, the radar data is compared with one or more criteria to identify a golf shot, such as a ball speed criterion that indicates a radar time series can only start in a certain speed range, which corresponds to the range of speeds that are likely for a golf ball that has just been hit (e.g., 22-112 meters per second). Thus, distant golf shots flying at low speed, as well other objects, such as birds and planes, can be readily ignored. Additional criteria can be used across a series of radar measurements, as those measurements are received in real-time. For example, a radar measurements series of a golf shot should have decreasing speed over time, and this fact can be used to identify a golf shot in the radar data.

In some implementations, a Doppler radar device provides radar readings at a fixed rate, some of which may be empty readings, i.e., when the radar isn't tracking anything. In addition to considering ball speed criteria to exclude speed readings that do not fall into a reasonable range for a golf ball launch, as noted above, various factors can be taken into consideration. Speed readings from the same golf ball should not be treated as a new launch, and so, speed readings that keep on coming after a verified ball launch in the radar data can be compared with the previous speed readings for that ball launch, and while those speed readings have a sufficiently similar radial speed, this data is likely a part of the same ball launch. Further, care should be taken in case the radar picks up on the golf club, or another ball flying in the background, to allow for a launch in the middle of several other radar readings that are not from a golf ball.

This can be achieved by looking for a sufficiently large jump in the radial speed for a new launch. Merely looking for a change in radial speed is not enough, as there may be two consecutive ball launches, where the last reading of the first launch matches the initial launch speed of the second launch. In this case, a check can be made for a minimum duration with empty readings between the last accepted reading and the potential launch. For radar devices other than a CW type radar, reporting a single object speed per measurement (one reading at a time, continuously), multiple (e.g., five or more) readings that are close in time can be compared (e.g., check speed and/or space proximity, depending on whether the radar device provides distance information) to detect ball launches. Thus, FMCW type radar, reporting multiple objects speeds (and distances) per measurement, can be used to detect ball launches by checking for readings that are sufficiently close to each other with a declining or inclining radial speed (depending on the expected preamble effect) and an increasing radial distance, within a specified threshold.

To prevent outliers from generating fake ball launches, outlier rejection can be used along with a radar model that limits deceleration and acceleration in speed. Note that acceleration in speed is needed to handle preambles, as described in further detail below. Further, it should be noted that, while modelling 308 of the speed of the golf ball is presented in FIG. 3A as occurring after the golf shot is detected, the one or more models of the radar data are used both to identify 304 a golf shot and thereafter to track the golf shot. Thus, the obtaining 302 of image data and radar data can be an ongoing process that continues to add new data to be used by the modelling 306, 308 and combining 310.

In any case, using a model of the radar speed data, each radar reading can be checked to see if it is an outlier among its neighboring readings (e.g., each reading is at most 5 meters per second off from the previous reading) and if most of the surrounding readings can be a part of the same model of a ball launch, the radar reading is a possible launch, and otherwise the radar reading can be discarded. Lonely readings can be discarded; in other words, a minimum number of nearby matching readings can be required for a radar launch. Note that various types of outlier rejection can be used, both at the point of identifying a launch and after a launch has been verified; for example, any reading that is more than two, three, or four standard deviations away from the model can be considered an outlier.

No matter the source of raw data, it should be filtered to avoid corrupting the model. When tracking a golf ball, using the Radar Optical Hybrid, adding outliers to either of the two models can result in losing track of the ball early, or merely producing an erroneous trace. To produce parameters associated with a trace, such as launch speed and angle, along with the carry, an accurate 3D path is required. Thus, it is important to utilize all the available data, without corrupting it with outliers. A single outlier in the wrong location can put either of the models off course, and this will be very apparent in the presented parameters.

In an ideal world, the ball speed should be strictly decreasing with an increasing t, where t is the duration from the launch time. But the raw data is a noisy signal, so rather than perform such a direct check on the ball speed criteria, a check for a downward trend can be made. For example, a linear fit can be performed over ten uniformly spread out samples between 0 and 0.4 seconds after the launch, and the slope of the line from this linear fit should be decreasing with an increasing t. However, this is not always possible either due to outliers and/or an imperfect preamble. Thus, the standard deviation from the linear fit can be checked, if it is too large after outlier rejection, then the data is likely for a fake launch.

In addition, while fake ball launches can still be identified in the radar data, these will be relatively rare and can be prevented from causing problems by cross-checking for ball launches using the image data from the camera. The 2D image data can be analyzed to identify camera observations of a golf shot. For example, streaming camera data 165 can be processed in real-time (e.g., using object classifiers) to identify various objects (e.g., a golfer and candidate balls) in the video stream, and a golf shot can be identified 304 when a series of candidate balls across a set of video frames meet or exceed one or more established criteria for a golf shot. In some implementations, the analyzing involves automated adjustment of one or more thresholds (e.g., an optimized threshold per pixel) to maximize sensitivity for objects of interest (e.g., objects that look like golf balls) as well as real-time filtering to enable identification of a golf shot before all the 2D image data of the golf shot is received. Further, when a golf shot is identified in the radar data, a signal can be sent to trigger an adjustment of the one or more criteria used in analyzing the 2D image data. In some implementations, potential ball launches are identified using only the radar readings, and then timestamps of these potential ball launches are provided to the optical tracking component, which can then apply its own ball launch criteria to confirm the ball launch is real. For further details, see U.S. Pat. Pub. No. 2019-0111315, published on Apr. 18, 2019, and titled "SYSTEM AND METHOD FOR THREE DIMENSIONAL OBJECT TRACKING USING COMBINATION OF RADAR AND IMAGE DATA", which patent application is hereby incorporated by reference.

A 2D trace of the golf ball in flight is modeled 306 using the 2D image data. In some implementations, the model is entirely in two dimensions, where the 2D tracking works by estimating where the ball should be in the 2D frame and searching the expected regions for 2D observations. While this is effective, it can be difficult to model a golf ball's flight once it has been projected onto the camera frame's image plane. Thus, for the 2D tracking to work properly, it should be fairly accepting for where it allows the next observation to be if the flight is modelled entirely in 2D. Further, as accepting an outlier 2D observation can lead to issues, the model can be improved by imposing stricter limits when searching for the next observation. In some implementations, this is achieved by modelling the flight in 3D rather than 2D, as it is much easier to define the shape of a golf shot in 3D, and so the model can be made much better. Further details regarding such implementations are provided below in connection with FIGS. 5A & 5B.

Further, note that the ball observations occur at separate instants in time, as determined by the frame rate of the camera and potentially missed detection(s) of the golf ball in one or more frames. Thus, a model of the ball flight can be used to fill in the blanks between the ball observations, thus defining a 2D path (or trace) of the golf ball in the 2D image data. Note that this can facilitate combining the 2D image data with the radar data, as the camera and radar device do not necessarily produce data at the same rate. Thus, it is not guaranteed that a 2D observation has a matching radar reading for the same time point. Nor is there any guarantee that the radar and camera observe the golf ball's entire flight.

It is common for one of the camera or the radar device to lose track of the ball before the other, and/or for short durations during the ball flight. Therefore, models for both the 2D observations and the radar readings can be used. The model for the 2D observations is referred to as the optical model, and the model for the radar readings is referred to as the radar model. To connect these two models in time, it is helpful to have a common timestamp for both the 2D observations and the radar readings. To get such a timestamp, an accurate difference between the duration required by the camera to produce a frame and the radar device to produce a radar reading is needed. This difference can be derived for a specific combination of a camera and a radar device through experimentation. In general, the timing between the radar readings and the 2D observations by the camera should be synchronized so the optical model and the radar model can operate in a shared time dimension.

A speed of the golf ball in flight is modelled 308 using the radar speed data and first and second model portions. As noted above, the speed measurement obtained using the radar antenna 260 does not include the tangential speed component 238. Because of this, the radar model is modelling the radial speed and not the actual speed of the golf ball. Thus, a simple radar model that models the speed of the golf ball as a declining exponential function will not be fully accurate with respect to the speed data.

Figure 3B:
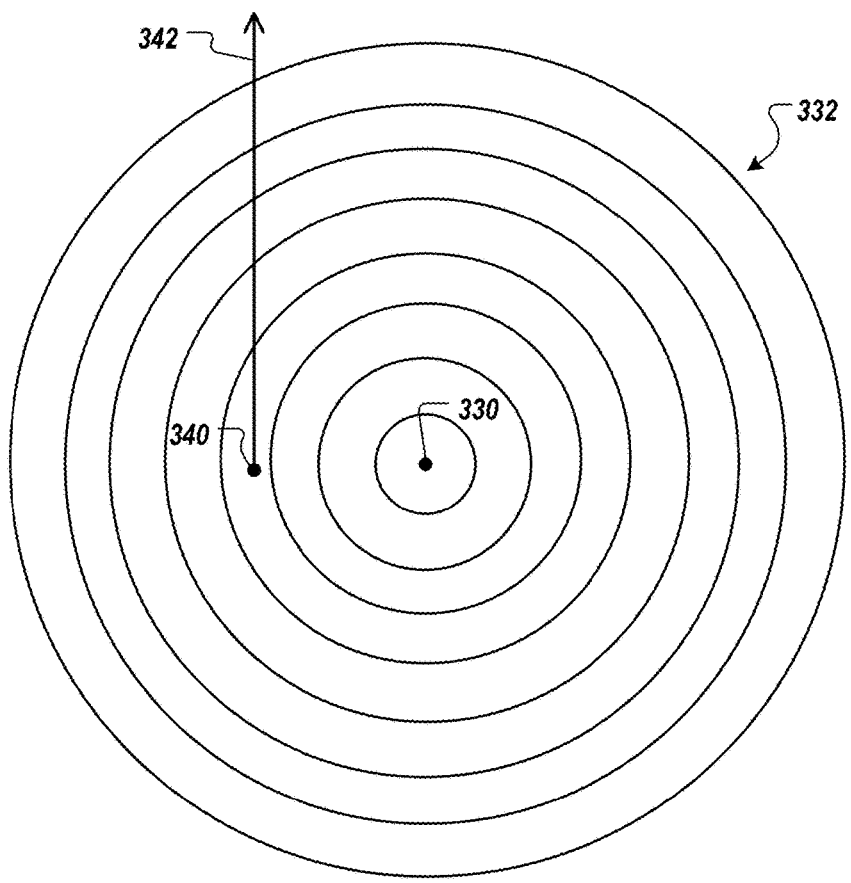
FIG. 3B shows an example of a golf ball launch from a location that is next to but spaced away from a radar device.

FIG. 3B shows an example of a golf ball launch from a location 340 that is next to but spaced away from (e.g., ten meters away from) a radar device 330. In FIG. 3B, each of the concentric circles 332 represents an additional three meters of radius around the radar device 330, and a golf shot 342 represents a golf ball launch from the location 340 with an initial ball speed of 75 m/s and a drag of 30 m/s$^2$. As shown, the position and direction of the golf shot 342 relative to the radar device 330 means that, even though the golf ball is travelling at 75 m/s immediately after being hit from location 340, the golf ball's radial speed (its speed along the line of sight from the golf ball to the radar device 330) is almost zero. Thus, for a short duration after the ball launch, the golf ball's radial speed is actually increasing quickly due to the geometry of the flight relative to the radar device's location. The radar speed data behaves much like an exponential model, except for a short duration after the launch, due to the geometry of the flight relative to the radar device's location.

Figure 3C:
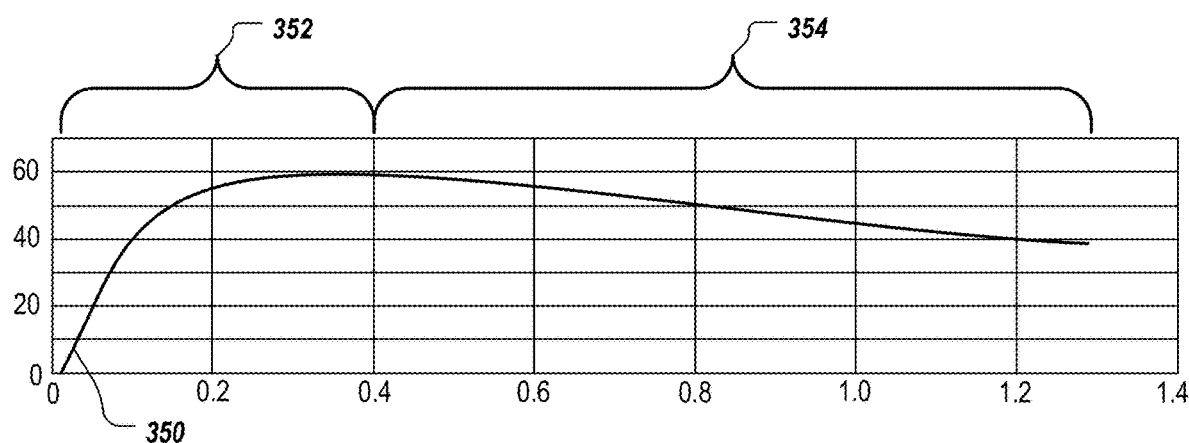
FIG. 3C shows an example of a radial speed curve for the golf ball launch of FIG. 3B.

FIG. 3C shows an example of a radial speed curve 350 for the golf ball launch of FIG. 3B. In FIG. 3C, the X axis represents time in seconds, and the Y axis represents radial speed in meters/second (m/s). As shown, for the first 0.4 seconds of ball flight, the radial speed is increasing rapidly, before the radial speed begins to drop off slowly. This initial variation in the radial speed from an exponential function, directly following the launch, is referred to herein as the preamble, and the effect it has on the radar model is referred to as the preamble effect. Note that the preamble in this example lasts for about 0.4 seconds, but the length of the preamble will vary depending the relative positions of the launch position and the radar device, and depending on the direction of the golf shot. The preamble effect is most apparent when the ball is close the radar and is typically insignificant after less than a second.

In general, each golf shot will have a first portion 352 that generates some amount of preamble effect, and a second portion 354 that can be modelled as an exponential curve. Thus, the radar model can be built from two simpler models: a preamble model and an exponential model. Referring again to FIG. 3A, modeling 308 the speed of the golf ball can include fitting a polynomial function to a first portion of the radar speed data and fitting an exponential function to a second portion of the radar speed data. In some implementations, the polynomial function is a quadratic function (a polynomial function of degree two). In some implementations, a higher degree polynomial fit is used, provided sufficient radar readings are available.

To use the two models as a single model, the transition point from the preamble to the exponential model (also referred to as the preamble partition point) should be found. When a second-degree polynomial is used to model the preamble of each golf shot, the preamble portion of the model may not fit the radar readings well near the transition point. Thus, to get a cleaner transition between the two models, the preamble can "borrow" a few radar readings from the exponential model. Note that this borrowing means the radar readings from the second portion are used in forming the preamble model, even though they are not part of the preamble. In some implementations, the modeling 308 includes using weighted models for a preamble portion of the radar speed data. Using a weighted model as the preamble model is useful to get a clean transition to the exponential model and to force a better fit.

For example, the weighted models can be models that fit the radar readings to the (quadratic) function representing the preamble, so as to (1) align the preamble model with the exponential model at the transition point, and (2) not only use datapoints near the transition point, which will not generally yield a usable function. Thus, the weighted models (1) place higher value on datapoints near the transition point, and (2) also place higher value on the earliest datapoints more than later ones, as these affect the outcome of the preamble the most. Thus, the radar readings near the launch and near the transition point are valued more than the datapoints between the two. Weighted fitting models can be used to achieve this, by putting more weight to these datapoints; thus the algorithm will prefer using these radar readings when producing the fit. An example of such a weighted fit is weighted least squares. Further details regarding modelling the radar speed data are provided below in connection with FIGS. 4A-4B.

The radar model of the speed of the golf ball in flight is combined 310 with the optical model of the two dimensional trace of the golf ball in flight to form a three dimensional trace of the golf ball in flight. This can involve finding radial distances to the golf ball by integration of speed values obtained from the radar model of the speed of the golf ball, and calculating three dimensional locations of the golf ball in space. The calculating can include using the radial distances to find depth distances to the golf ball, and using the depth distances and horizontal and vertical values (angles or data representative of angles) obtained from the optical model to find horizontal and vertical distances to the golf ball based on at least a focal length of the camera.

This process can be understood in terms of rays and a distance. The internal camera parameters can be used along with a 2D pixel coordinate to produce a ray in 3D, in the camera's coordinate system, that passes through the origin. This ray has at most two 3D points at any given distance from the radar in the general case. In the simple case, where the camera and radar are placed at the same position, there are exactly two such 3D points, of which only one is in front of the camera. Thus, there is a single possible 3D observation for every 2D observation and distance pair. If distortion in the camera lens is disregarded, then at least the chip size, focal length and pixel size of the (internal) camera parameters are used. Further details are provided above in connection with equations (1)-(4). In addition, the radar device need not be co-located with the camera.

The 3D trace of the golf ball in flight in 3D space is output 312 for display. This can involve directly outputting the 3D trace to a display device, or sending the 3D trace to another computer or process that will display information about the 3D trace. For example, the 3D trace data can be output to one or more computers 120, 122 for inclusion in a TV broadcast of the golf ball flight. As another example, the 3D trace data can be output to one or more computers 120, 122 for inclusion in a virtual environment. The virtual environment can be a computer model of a golf course, e.g., generated by drone 126, which can be displayed as part of a TV broadcast or be displayed on a display device at a golf range facility as part of a simulated golf game, in which data from actual golf shots is integrated into the simulated game of golf. Moreover, in some cases, the simulated game of golf need not match the traditional game of golf or include any model of a traditional golf course. The virtual environment can represent an entirely artificial game world, in which the data from actual golf shots is integrated into the 3D space of the artificial game world.

Further, as noted above, the obtaining 302 of image data and radar data can be an ongoing process that continues to add new data to be used by the modelling 306, 308 and combining 310. Likewise, the outputting 312 can be an ongoing process that continues to output 3D trace data while a golf shot is actively being tracked using the modelling 306, 308 and combining 310. Similarly, before a golf ball launch is verified, the output data generated by the modelling 306, 308 and/or combining 310 operations can be used as input to the golf shot detection 304, thus improving the ability to catch fake ball launches (a detected in-flight object that is not a golf ball).

For example, an initial portion of a 3D trace (produced by obtaining 302 2D image data and radar data, modeling 306 a 2D trace of an object in flight using the 2D image data, modeling 308 a speed of the object in flight using the radar speed data, and combining 310 a radar model of the speed of the object with an optical model of the 2D trace of the object) can be compared 360 with ball launch criteria. This ball launch criteria represents one or more characteristics of a typical golf ball launch in three dimensions, and is thus distinct from ball launch criteria applied solely in the 2D space of the image data from the camera, or ball launch criteria applied to the speed data from the radar device. If the initial portion of the 3D trace differs 362 by at least a threshold amount, this identifies the 3D trace of the object in flight as not a golf ball. Thus, a previously identified ball launch can be rejected as a golf ball launch based on the criteria applied in 3D space, or a previously identified ball launch can be verified as a golf ball launch based on the criteria applied in 3D space.

For example, the comparison can be made by computing the angle between two rays: the first ray, $r_1$, being produced by 3D data points $p_0$ and $p_1$, and the second ray, $r_2$, being produced by 3D data points $p_1$ and $p_2$. Where $p_0$ is the launch position, $p_1$ is x seconds after launch, and $p_2$ is 2x seconds after the launch. If the angle between $r_1$ and $r_2$ exceeds y degrees, the trajectory is not straight enough to be considered a golf ball shot, and so the object is identified as not being a golf ball. If the angle between $r_1$ and $r_2$ is less than or equal to y degrees, the trajectory is straight enough to be considered a golf ball shot, and so the object is identified as being a golf ball and is tracked further. In some implementations, x is set between 0.2 seconds and 0.25 seconds, and y is set between 1 degree and 5 degrees. Note that the x and y parameters can be set based on a given implementation after appropriate tuning and testing. Moreover, these values can be changed for a given golf shot after further data is received, such as when 3D information from further on (e.g., from the fairway on a golf course) indicates that the shot is not long, meaning there can be more angle to the shot early on.

Further, interpolation between two observations or extrapolation (e.g., backwards to the launch position) to estimate where the ball should be in both 2D and 3D at any given point in time is simpler to do if a 3D path has been determined. When the launch position is known, it is also simpler to get a good estimate of the launch time using a determined 3D path, and knowing the launch time is important when computing the launch speed, since the ball is decelerating with approximately forty five miles per hour per second, thus a launch time mistake of twenty two milliseconds results in an error of roughly one mile per hour, even with a perfect understanding of the ball's flight.

In addition to using output data from process operations 306, 308, 310 to improve the golf shot detection 304, such as discussed above, output data 370 from one or more of the process operations 302, 306, 308, 310 can be used as input to improve the functioning of one or more other process operation 302, 306, 308, 310. For example, the 2D ball tracker can use radial speed readings from the radar device (rather than a fixed parameter ball speed) to form a quick estimate of the ball's motion in 3D, which can then be projected back into the 2D image plane of the camera to assist in identifying the ball and tracking its motion in 2D. Further details regarding using 3D motion estimation to perform 2D tracking is provided below in connection with FIG. 5B, but it should be noted that an advanced and accurate model of the radar readings need not be constructed for this radar speed data to be useful to the 2D tracker.

For example, the radar readings can be integrated to produce spheres around the radar device where the ball should reside somewhere on the surface, and the projection matrix of the camera can be used to extend 2D observations into rays extending from the camera to produce 3D observations where the rays intersect the spheres. These 3D observations can then be used with the existing physics models of ball flight in 3D. Note that the set of spheres used will likely vary, as the integration should begin at the launch time of the ball flight. In other implementations, a more advanced and accurate model of the radar readings is used to determine the speed of the ball for use in 2D tracking.

Figure 4A:
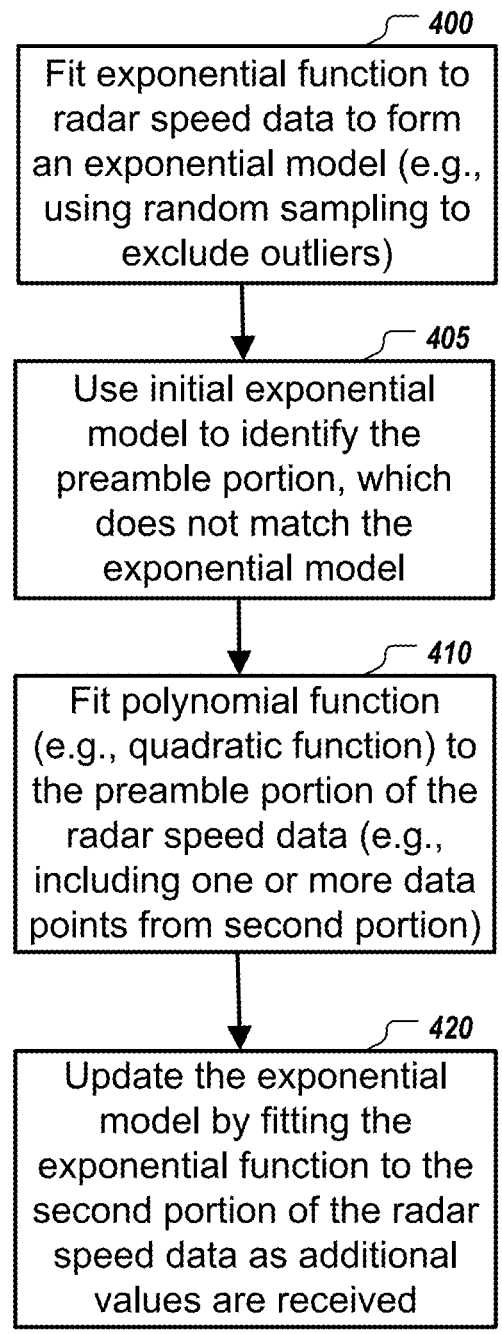
FIG. 4A is a flowchart showing an example of a process to model the speed of a golf ball in flight using radar speed data.

FIG. 4A is a flowchart showing an example of a process to model the speed of a golf ball in flight using radar speed data, i.e., an example of modeling 308. An exponential function is fit 400 to initial values of the radar speed data to form an exponential model of the radar speed data. Fitting 400 the exponential function to the initial values of the radar speed data can involve using random sampling to exclude outliers in the radar speed data. For example, the random sample consensus (RANSAC) algorithm can be used to avoid outliers and help improve the fit. Other approaches to outlier rejection, such as heuristics or hard coded outlier rejection, can be used. Also, if the fit produces an unreasonably larger number of outliers, e.g., more than one third or more than half of the input data points, the fit can be rejected.

This (initial) exponential model of the radar speed data is used 405 to identify a first portion of the radar speed data, which does not match the exponential model, i.e., to find the preamble partition point. To locate the preamble partition point a starting position is required. Such a position can be found using the exponential fit model, starting far enough back that a preamble is not possible. For example, in most implementations, the preamble effect is negligible by 0.5 seconds after the ball launch, so it can be presumed that the partition point occurs before this time. Once an initial exponential model is found, this model is extended backwards towards the preamble, while keeping track of how well the model matches the next points. An example is shown below in tabular format.

TABLE 1

| Matched: | 0 | 0 | 1 | 0 | 0 | 0 | 1 | 1 | 0 | 1 | 1 | 1 | 1 | 1 | 1 | 1 |
|---|---|---|---|---|---|---|---|---|---|---|---|---|---|---|---|---|
| Index: | 0 | 1 | 2 | 3 | 4 | 5 | 6 | 7 | 8 | 9 | 10 | 11 | 12 | 13 | 14 | 15 |

In Table 1, the first row contains a 1 if the exponential fit model matches the radar reading, and 0 otherwise. The second row contains a datapoint index. In this case it is simple to define the preamble partition point at roughly index 6, where one fifth of the radar readings matched the exponential fit model before, and nine tenths matched after.

Once the preamble portion is identified 405, a polynomial function (e.g., a quadratic function) is fit 410 to this first portion of the radar speed data to form a polynomial model that fits the first portion of the radar speed data. The fitting 410 can also employ outlier rejection, such as random sampling to exclude outliers in the radar speed data. For example, the RANSAC algorithm can be used to build 410 the preamble model. Other approaches to outlier rejection, such as heuristics or hard coded outlier rejection, can be used. Also, if the fit produces an unreasonably larger number of outliers, e.g., more than one third or more than half of the input data points, the fit can be rejected.

In addition, the fitting 410 can include one or more values of the second (exponential) portion of the radar speed data to form a polynomial model that fits the first portion of the radar speed data and also meets the exponential model of the radar speed data at a transition point between the first portion and the second portion of the radar speed data. Using a few extra radar readings from the second (exponential) portion of the radar speed data in the fitting 410 helps ensure a close match between the two models (the polynomial model and the exponential model) at the preamble partition point.

The exponential model is then updated 420 by performing the fitting of the exponential function to the second portion of the radar speed data, including as additional values in the radar speed data are received from the radar device and added to the second portion. Further, in some implementations, fitting 420 the exponential function to the second portion of the radar speed data also includes using random sampling to exclude outliers in the radar speed data. For example, the RANSAC algorithm can be used to avoid outliers and help improve the fit. Other approaches to outlier rejection, such as heuristics or hard coded outlier rejection, can be used. Also, if the fit produces an unreasonably larger number of outliers, e.g., more than one third or more than half of the input data points, the fit can be rejected. In any case, the two models (polynomial model and exponential model) are combined to form the full radar model.

Further, this full radar model can be used to define what an outlier is by computing the standard deviation for the added radar readings. Using a multiple of the standard deviation is a quick way to locate outliers; a multiple of four makes false positives very unlikely (about 0.006% to 4% chance), a multiple of three makes false positives unlikely (about 0.3% to 6.25% chance), and a multiple of two makes false positives somewhat unlikely (about 5% to 11.1% chance). The range of chances here depends on how close to a perfectly modelled normal distribution the data gets, and in practice, Chebychev's Inequality is a good approximation of the chances. Note that adjusting the cutoff allows a careful balancing of rejecting inliers and accepting outliers, and using between two and four standard deviations as the cutoff generally results in between 11.1% and 4% of inliers being incorrectly removed as outliers.

The standard deviation is typically a very small number, so it is reasonable to have a lower bound on the limit; and similarly, the limit has an upper bound to avoid following slow trends, such as the transition to the preamble model. For future points being added, this limit can then be used to determine if it matches the model as well as such nearby radar readings usually do to reject outliers. In addition to checking for outliers using the standard deviation, the process can check the total number of outliers (rejected data points) when deciding whether or not a fit is acceptable. For example, a check can be made as to whether the number of outliers is less than half or less than one third of all the data points input to the fit, and also check the standard deviation of the outliers to determine how good the fit is, and thus whether or not to accept it.

Figure 4B:
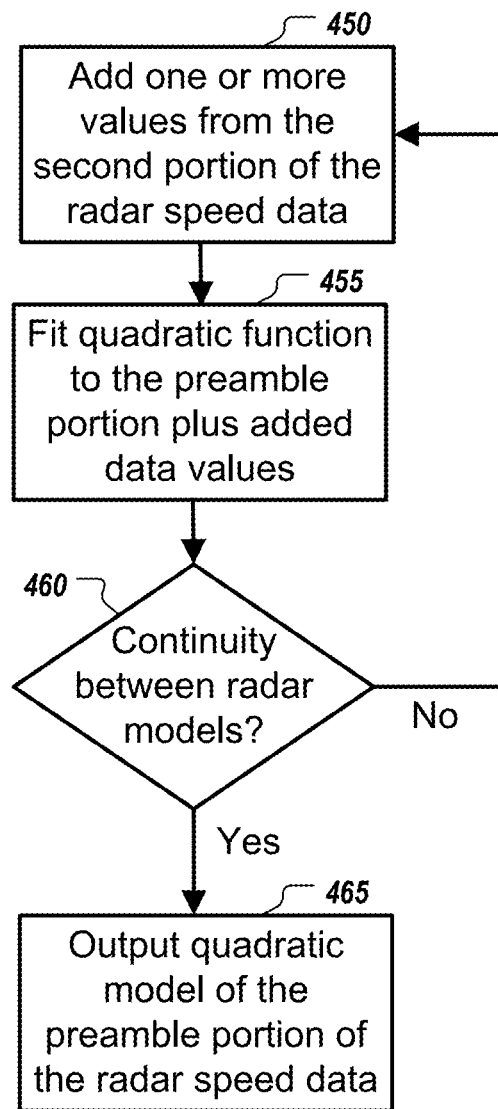
FIG. 4B is a flowchart showing an example of a process to fit a quadratic function to a preamble portion of a golf ball's flight.

FIG. 4B is a flowchart showing an example of a process to fit a quadratic function to a preamble portion of a golf ball's flight, i.e., an example of fitting 410. In this example, fitting of the polynomial function to the first portion of the radar speed data and the one or more values of the second portion of the radar speed data involves iteratively including more of the one or more values of the second portion of the radar speed data until a threshold level of continuity between the polynomial model and the exponential model is reached at the transition point. In addition, in some cases, since the preamble may be far less than a half a second long, there may not be enough radar readings in the preamble portion alone to establish a polynomial model. Thus, in some implementations, a check can be made to see if there are enough data points to build a preamble model before any data points are borrowed from the second portion of the radar speed data.

One or more values can be added 450 from the second portion of the radar speed data to the first portion for purposes of creating the preamble model. A quadratic function can be fit 455 to the preamble portion plus the added data values. Continuity is checked 460 between the two radar models (the quadratic model and the exponential model) at the transition point, and more data values are added 450 until a threshold level of continuity is achieved. For example, the nominal values and the first order derivatives (slopes) provided by the two models at the transition point can be compared to see if they are within threshold distance(s) of each other. In some implementations, the goal is a single "virtual" function that is $C^0$ and $C^1$ continuous, even though it is modelled as two separate functions.

For example, let $e(t)$ be the exponential model, $p(t)$ be the preamble model, and to be the transition point. The combined model can then $f(t)=\{p(t) \text{ if } t<t_0 | e(t) \text{ if } t>=t_0\}$. Also assume that both $e(t)$ and $p(t)$ are both $C^0$ and $C^1$ continuous. $C^0$ for f is achieved if $p(t_0)=e(t_0)$. But to avoid a sharp edge in fat $t_0$, $C^1$ continuity should also be sought, meaning that $p'(t_0)=e'(t_0)$, where p' and e' are derivatives of p and e respectively. But as these are two completely different functions, an exact match need not be required for either of the continuity checks. Thus, the check can be that $|p(t_0)-e(t_0)|<\varepsilon_0$ and $|p'(t_0)-e'(t_0)|<\varepsilon_1$ for some sufficiently small value for $\varepsilon_0$ and $\varepsilon_1$, where the discontinuity is not that visible. Note that higher order continuity checks are also possible. The continuity check ensures there will be a smooth transition between the two models. Then, the quadratic model of the preamble portion of the radar speed data is output 465 for subsequent use in modelling the full flight of the golf ball.

Figure 5A:
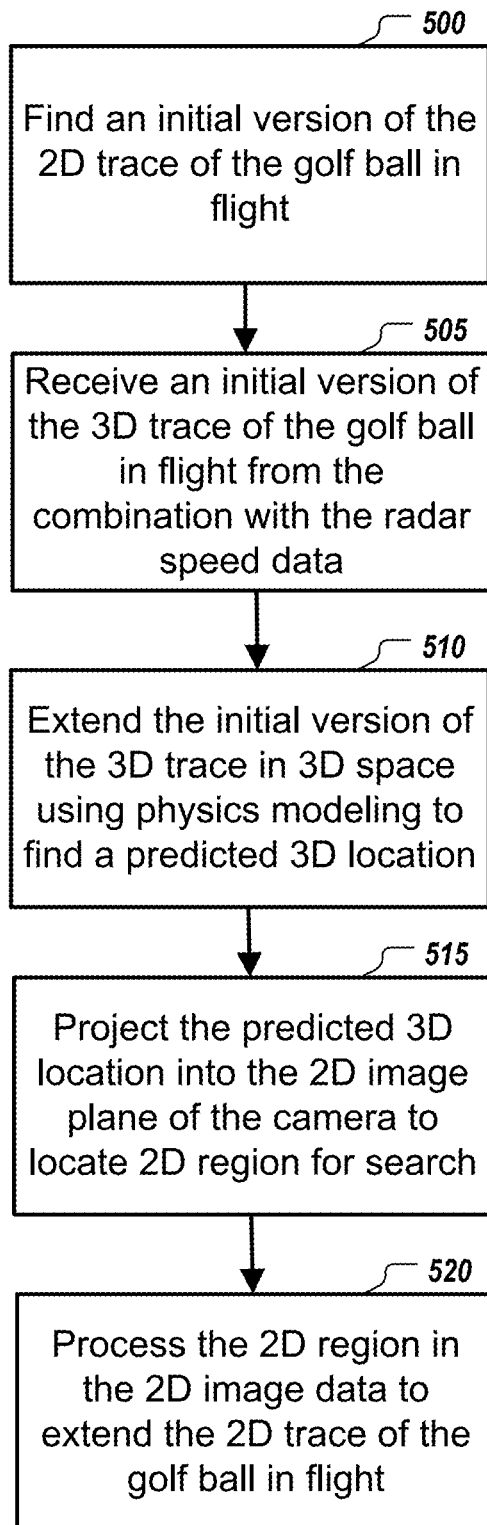
FIG. 5A is a flowchart showing an example of a process to model a 2D trace of a golf ball in flight using 2D image data and an initial 3D trace from a combination of 2D image data with radar speed data.

FIG. 5A is a flowchart showing an example of a process to model a 2D trace of a golf ball in flight using the 2D image data, i.e., an example of modeling 306. An initial version of the two dimensional trace of the golf ball in flight is found 500. This involves identifying a ball observation in the camera data for the next frame, as described above. Moreover, note that optical tracking should be very accepting of new ball observations to work properly, which increases the risk of adding outliers to the optical model. Thus, in some implementations, the outlier rejection for the optical tracking is improved by avoiding the optical model when locating outliers, and instead detecting outliers using a 3D model, since a 3D model better describes how the ball moves.

Thus, an initial version of the three dimensional trace of the golf ball in flight is received 505 from combining the camera data and the radar data. The current radar model can be used to extend the 2D ball observations into 3D observations, as described above, and these 3D observations then form the basis of a 3D path, which is easier to extend into the future using a simple 3D model. Such a model only needs to be accurate for a fraction of a second into the future to locate the next 2D observation, which makes it less affected by physical-world conditions, such as wind. Nonetheless, in some implementations, the initial version of the three dimensional trace in three dimensional space is extended 510 in accordance with physical-world conditions associated with the golf ball in flight to find at least one three dimensional location beyond the initial version of the three dimensional trace.

The at least one three dimensional location is projected 515 into a two dimensional image plane of the camera to locate a two dimensional region. The two dimensional region in the two dimensional image data is processed 520 to extend the two dimensional trace of the golf ball in flight. Note that this can include determining a size of the two dimensional region based on an estimate of error for the initial version of the three dimensional trace in three dimensional space. Since the ball flight is being modelled in 3D, this model can be used to extrapolate where the ball should be in 3D. But since this model is not perfect, a region around the modelled position is used, based on the expected largest error in the model. The modelled position and its error produce a 3D shape, which can be projected into a 2D region in the camera's image plane, using the internal parameters of the camera. Note that only the internal parameters are needed since the 3D position can be in the camera's coordinate system at this stage. The 2D shape can then be searched for 2D observations of possible golf balls. The algorithm can prefer 2D observations closest to the modelled position, and the image processing time can be reduced since all portions of each image frame need not be searched.

Figure 5B:
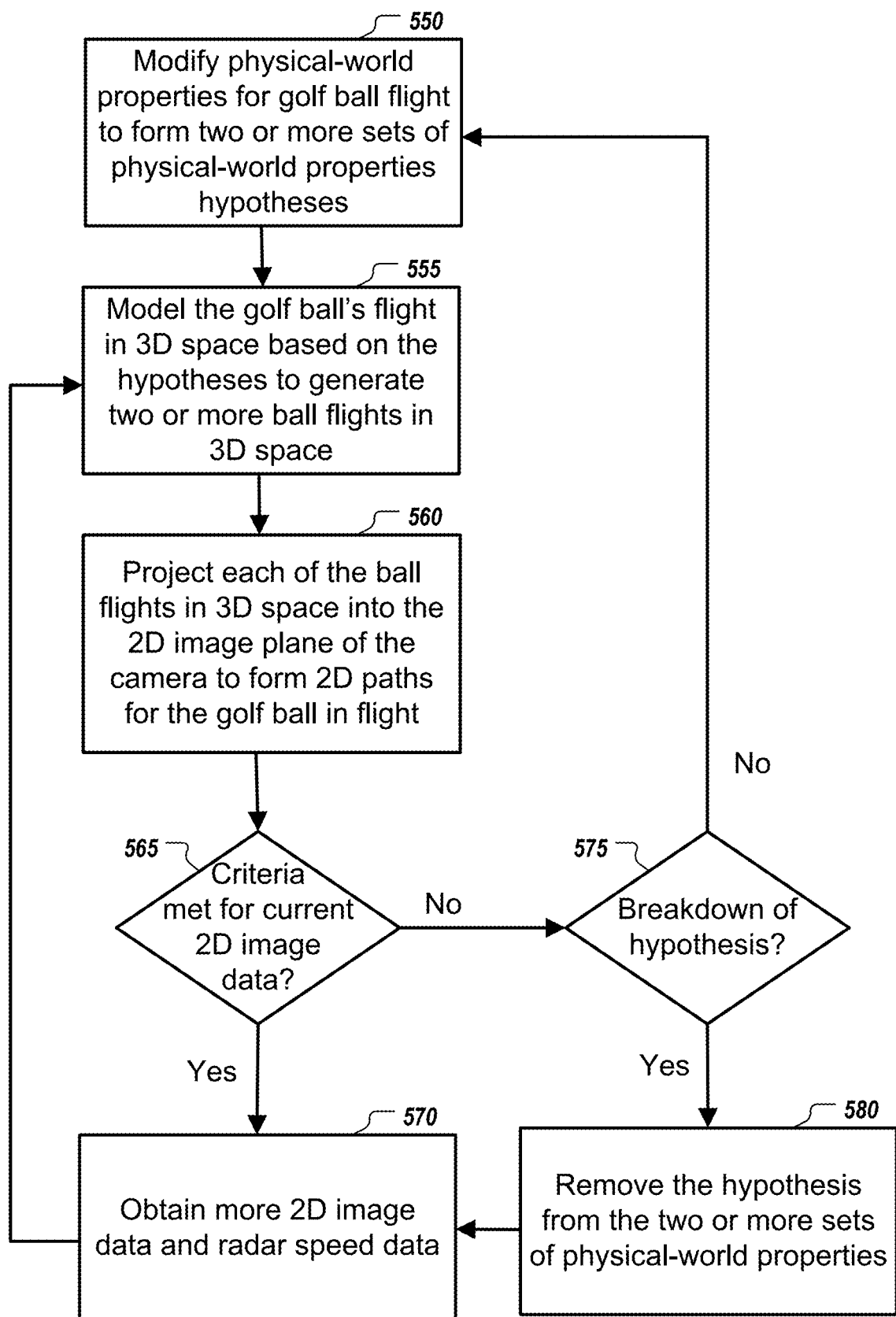
FIG. 5B is a flowchart showing an example of a process to extend a current version of a 3D trace to facilitate extending a 2D trace of the golf ball's flight.

FIG. 5B is a flowchart showing an example of a process to extend a current version of a 3D trace to facilitate extending a 2D trace of the golf ball's flight, i.e., an example of extending 510, projecting 515, and processing 520. The physical-world conditions associated with the golf ball in flight are modified 550 to form two or more sets of physical-world conditions. The physical-world conditions can include wind speed and direction, ball spin amount, ball spin axes, temperature, humidity, etc. Note that some physical-world conditions, such as wind speed and direction, can have initial values set by data received from sensors at the golf shot's location.

The golf ball's flight is modelled 555 in three dimensional space in accordance with the two or more sets of physical-world conditions to generate two or more ball flights in three dimensional space. This involves using a physics modeler, which knows how a ball is supposed to fly through the air given a set of physical-world conditions. Each of the two or more ball flights in three dimensional space is projected 560 into the two dimensional image plane of the camera to form two or more two dimensional paths for the golf ball in flight. The two or more two dimensional paths are compared with at least a portion of the two dimensional image data corresponding to the initial version of the two dimensional trace, and one of the two or more sets of physical-world conditions is selected (based on the comparing) for extension of the initial version of the three dimensional trace in three dimensional space.

Note that the selecting here need not be a formal choice of one 2D path over another. Rather, the algorithm can form many hypotheses (regarding the options for the physical-world conditions) and continue processing all existing hypothesis until they "break down" as a result of the incoming data. Note that a hypothesis can break down for various different reasons, but if there's nothing observed in the expected (extrapolated) regions proposed by a given hypothesis, that hypothesis will eventually break down. Moreover, each hypothesis can break down or produce further hypothesis, and most of the hypothesis will eventually break down and typically leave one surviving best hypothesis for the ball's flight.

For example, each hypothesis can have its 2D projection checked 565 to determine if the criteria for finding a ball observation are met for the current 2D image data. If so, more 2D image data and radar speed data are obtained 570 for use in modeling 555 the golf ball's flight in 3D based on that hypothesis. If the criteria for a given hypothesis are not met 565, a check 575 can be made to determine whether the given hypothesis has broken down. For example, if no ball observation has been found for a given hypothesis in the last four image frames, the hypothesis has broken down. In this case, this hypothesis can be removed 580 from the two more sets of physical-world conditions, before the algorithm proceeds to obtain 570 more 2D image data and radar speed data. Note that this process can be used to discard a fake launch as well; if the 3D observations are unable to produce a valid 3D trace, it can be discarded as a fake launch.

If a given hypothesis has not broken down 575, but the criteria was not met 565, then the physical-world conditions can be modified 550 to try to improve the hypothesis for the 3D ball flight. Note that weather conditions can make it difficult to extrapolate a 3D path. Thus, on a very windy day, losing track of the ball early can be disastrous for determining the carry, and so checking many different hypotheses regarding various physical-world conditions (such as different wind speeds and directions, including changes in these during different portions of the ball's flight) concurrently can maximize the system's ability to accurately track the ball. In some implementations, the current hypothesis is changed and checked against the prior camera frames. In some implementations, the hypothesis spawns one or more new hypotheses, as the current hypothesis may turn out to be better when more data comes in, rather than being removed 580 after more data comes in. Moreover, in some implementations, a check made to ensure that the number of hypotheses doesn't get too high, or else the computer won't be able to process them. This is most crucial for shorter paths, as there shouldn't be many long-lasting hypotheses, e.g., a leaf, bird, fly or anything else can at any point in time move just like a golf ball would in 2D, and accidentally coincide with reasonable radar readings, but eventually either of these data sources should cause the hypothesis to break down. Thus, if the system receives 2D observations and radar readings forming a reasonable 3D golf ball path for more than a second, it is quite unlikely to be anything other than a real golf ball.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the description above focuses on tracking a golf ball shot, but the systems and techniques described are also applicable to other types of object flight tracking, such as for baseball or skeet shooting, as well as non-sports applications. Further, tracking an object "in flight" can include tracking the object when it bounces off and/or rolls along the ground, in some implementations. In addition, the actions recited in the claims can be performed in a different order and still achieve desirable results.

What is claimed is:

1. A method comprising:
   determining an optical model of an object in flight using two dimensional image data obtained from a camera;
   determining a radar model of the object in flight using radar data obtained from a radar device;
   combining the radar model with the optical model to produce three dimensional location information of the object in flight in three dimensional space;
   comparing the three dimensional location information of the object in flight with data representing an expected ball launch; and
   rejecting, or verifying, the object as an actual ball launch in response to the three dimensional location information of the object in flight differing, or not differing, from the data representing the expected ball launch by a threshold amount.

2. The method of claim 1, wherein the data is an expected angle, and the comparing comprises:
   computing an angle between two rays determined from the three dimensional location information; and
   checking if the angle between the two rays exceeds the expected angle.

3. The method of claim 2, wherein a first of the two rays is from a launch position to a first point in the three dimensional location information, and a second of the two rays is from the first point in the three dimensional location information to a second point in the three dimensional location information.

4. The method of claim 3, comprising changing the expected angle and a timing after launch of the first and second points in response to further data obtained for the object in flight.

5. The method of claim 2, wherein the expected angle is between 1 degree and 5 degrees.

6. The method of claim 2, comprising, after verifying the object is a ball that has been launched, extrapolating a three dimensional path determined from the three dimensional location information of the object in flight backwards to a launch position.

7. The method of claim 1, comprising, after verifying the object is a ball that has been launched:
   using a three dimensional path determined from the three dimensional location information of the object in flight to estimate a launch time for the ball; and
   computing a launch speed for the ball using the launch time.

8. The method of claim 7, wherein determining the optical model of the object in flight comprises projecting a three dimensional path determined from the three dimensional location information into an image plane of the camera to assist in identifying and tracking the ball in two dimensions.

9. The method of claim 7, wherein the ball is a golf ball.

10. A system comprising:
    a camera;
    a radar device; and
    one or more computers configured to
        determine an optical model of an object in flight using two dimensional image data obtained from the camera,
        determine a radar model of the object in flight using radar data obtained from the radar device,
        combine the radar model with the optical model to produce three dimensional location information of the object in flight in three dimensional space,
        compare the three dimensional location information of the object in flight with data representing an expected ball launch, and
        reject, or verify, the object as an actual ball launch in response to the three dimensional location information of the object in flight differing, or not differing, from the data representing the expected ball launch by a threshold amount.

11. The system of claim 10, wherein the data is an expected angle, and the one or more computers are configured to:
    compute an angle between two rays determined from the three dimensional location information, and
    check if the angle between the two rays exceeds the expected angle.

12. The system of claim 11, wherein a first of the two rays is from a launch position to a first point in the three dimensional location information, and a second of the two rays is from the first point in the three dimensional location information to a second point in the three dimensional location information.

13. The system of claim 12, wherein the one or more computers are configured to change the expected angle and a timing after launch of the first and second points in response to further data obtained for the object in flight.

14. The system of claim 11, wherein the expected angle is between 1 degree and 5 degrees.

15. The system of claim 11, wherein the one or more computers are configured to, after verification that the object is a ball that has been launched, extrapolate a three dimensional path determined from the three dimensional location information of the object in flight backwards to a launch position.

16. The system of claim 10, wherein the one or more computers are configured to, after verification that the object is a ball that has been launched:
    use a three dimensional path determined from the three dimensional location information of the object in flight to estimate a launch time for the ball, and
    compute a launch speed for the ball using the launch time.

17. The system of claim 16, wherein the one or more computers are configured to determine the optical model of the object in flight by performing operations comprising projecting a three dimensional path determined from the three dimensional location information into an image plane of the camera to assist in identifying and tracking the ball in two dimensions.

18. The system of claim 16, wherein the ball is a golf ball.
19. The system of claim 10, wherein the camera is a single digital video camera.
20. The system of claim 10, wherein the radar device is a phased array radar device.

\* \* \* \* \*